Figures 1, 2:
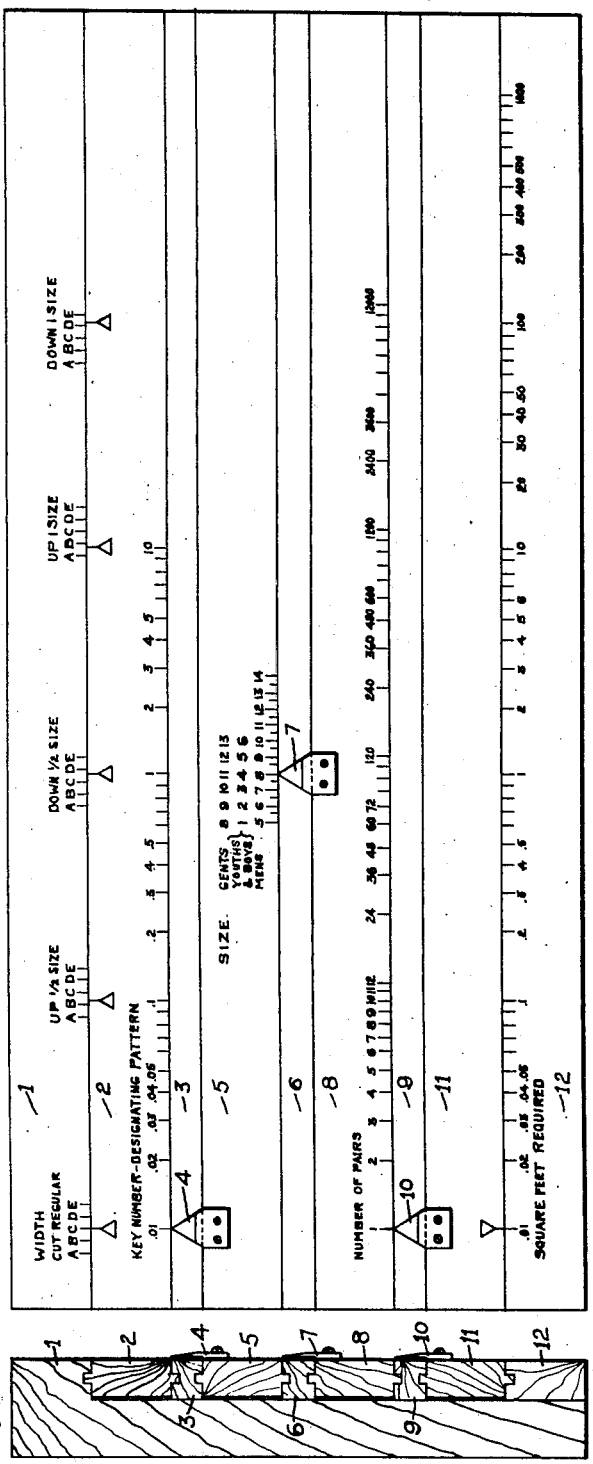

July 22, 1924.

M. H. REYMOND 1,501,920

LEATHER ESTIMATING SLIDE RULE

Filed May 18, 1922

INVENTOR

Martin H. Reymond

Patented July 22, 1924.

1,501,920

UNITED STATES PATENT OFFICE.

MARTIN H. REYMOND, OF BINGHAMTON, NEW YORK.

LEATHER-ESTIMATING SLIDE RULE.

Application filed May 18, 1922. Serial No. 562,017.

*To all whom it may concern:*

Be it known that I, MARTIN H. REYMOND, a citizen of the United States, residing at Binghamton, in the county of Broome and State of New York, have invented a new and useful Leather-Estimating Slide Rule, of which the following is a specification.

This invention relates to a particular construction of multiple slide rule. The purpose of this slide rule is the computation of the amount of leather of certain description required for producing, within reasonable limits any given quantity of shoes of any given description.

The accompanying drawing illustrates the construction of this slide rule. Figure 1 is a front elevation of the rule, shown standing on edge; and Figure 2 is a side elevation of the rule, in the same position. Similar numerals in the two views refer to similar parts.

The base 1 and the attached grooved blocks 3, 6, 9 and 12 form the stationary parts of the rule. The slides are designated by the numbers 2, 5, 8 and 11.

The various factors defining the amount of leather of definite description required to cut a given quantity of a given description of shoe are: a key number designating the pattern to be cut; the size of the shoe; the width of the shoe; and the quantity to be cut. These factors are all taken into account by the herein described slide rule. While the arrangement of these various factors on the rule is susceptible of considerable variations, I have shown what I consider a preferred arrangement. Base 1 contains a scale of widths on the edge adjacent to slide 2. Slide 2 contains a marker on the edge adjacent to base 1, and a scale of key numbers (by which any pattern is designated) on the edge adjacent to slide 5. Slide 5 contains a marker 4 on the edge adjacent to slide 2, and a scale of sizes on the edge adjacent to slide 8. Slide 8 contains a marker 7 on the edge adjacent to slide 5, and a scale of quantities (in pairs of shoes) on the edge adjacent to slide 11. Slide 11 contains a marker 10 on the edge adjacent to slide 8, and another marker on the edge adjacent to stationary block 12. Stationary block 12 contains a scale of square feet required on the edge adjacent to slide 11. On base 1 there are also shown four auxiliary width scales similar to the first width scale, and on slide 2 similar markers to that for the first width scale for each of these respective scales, except that they are shifted in position relatively to said respective scales to allow for cutting shoes up or down one half or one whole size, as is sometimes done.

The rule is operated as follows: The proper width scale on block 1 is first selected depending on whether the shoes are to be cut regular, up or down one half or one whole size. The corresponding marker on slide 2 is then brought next to the desired width. Then the marker on slide 5 is brought next to the key number, designating the pattern, on slide 2. Then the marker on slide 8 is brought next to the desired size on slide 5. Then the marker 10 on slide 11 is brought next to the desired number of pairs on slide 8. Finally the square feet required is read on the scale on block 12 next to the marker on slide 11 adjacent to this scale.

The width is the first factor considered, as this often is constant for a large number of computations, in which case slide 2 need only be set once for the entire number. The key number designating the pattern, which is the amount of leather of a given cutting quality required for one pair of shoes of mean size and width, is the second factor considered, as this is often constant for a variety of sizes and quantities. The size and quantity are considered last as these usually vary with each computation made.

The scales on slide 2 and block 12 are identical logarithmic scales. The scale on slide 8 is likewise identical except that it is shifted to the left. The size and width scales are laid off on similarly identical logarithmic scales in accordance with the ratio of leather required for any size or width, referred to the mean size or width. These scales are, however, for convenience marked with the respective sizes and widths instead of with said ratios. Certain liberties have been taken in not showing all the various divisions on the various scales that would appear on the rule itself, and also in not showing some of the scales in exactly their true proportions. This is for the sake of avoiding excessive fineness in the drawing. In practice a slide rule of this kind would preferably be about two feet long.

Marker 7, cooperating with the size scale on slide 5, is normally located, as shown in the drawing, at a mean position. This marker is shown in the drawing at size 8 for a men's run, 4 for a boy's run, and 11 for a little gent's run, which are approximately the mean sizes for these respective runs. It is important that this marker be thus normally located at an approximate mean size, because key numbers are established for such mean sizes, as already mentioned. The same holds true regarding the markers on slide 2 corresponding to the width scales on the body of the rule 1. If shoes are cut "regular" the marker is normally located at C width. If cut "up" or "down" the marker is shifted from the C position towards the A width or towards the E width by an amount corresponding to a half or a whole size as the case may be. The term normally refers to the slides all being evenly closed in as shown in the drawing.

A preferred material of which to make such a rule is wood covered with white celluloid upon which the various markings are engraved, as is usually employed for slide rules. The markers 4, 7, and 10 are preferably German silver or other metal.

The construction shown in the drawing of having the slides separated from each other by stationary blocks, the markers for stepping from scale to scale overhanging these stationary blocks, is of advantage in making the motion of each slide entirely independent of the others, and thus avoiding any disturbance of one setting in making another.

The herein described slide rule provides a simple and rapid apparatus for computing the leather required for cutting shoes. The mathematical formula embodied in this slide rule, viz:

Width ration × key number × size ratio × quantity = area required, in which:

$$\text{Width ratio} = \frac{\text{area of mean size and actual width}}{\text{area of mean size and mean width}}$$

and:

$$\text{Size ratio} = \frac{\text{area of mean width and actual size}}{\text{area of mean width and mean size}},$$

has proved to be too complicated to become generally used in practice per se in estimating leather. The present slide rule makes available to the public a function heretofore only available through the agency of comparatively large, complicated, and expensive calculating machines, which have come into commercial use because of the impracticability of said mathematical formula per se, and because of the absence of any simpler apparatus such as herein disclosed.

Such a slide rule may also be used for computing the material required for cutting gloves or other articles.

The following claims substantially embrace the invention. However, in the interest of definiteness and clearness in these claims, no attempt is made to embrace possible, but inventively insignificant, interchanges in position between markers and corresponding scales, such as are possible in all slide rules containing markers. The usual liberality of interpretation is intended in this respect.

I claim as my invention:

1. A logarithmically graduated multiple slide rule comprising in respective order: a stationary scale on the body of the rule; an adjacent slide containing a marker cooperating with said scale, and a second scale; a second slide containing a marker cooperating with said second scale, and a third scale; a third slide containing a marker cooperating with said third scale, and a fourth scale; and finally a fifth scale on the body of the rule cooperating with said fourth scale.

2. A logarithmically graduated multiple slide rule comprising in respective order: a stationary scale on the body of the rule; an adjacent slide containing a marker cooperating with said scale, and a second scale; a second slide containing a marker cooperating with said second scale, and a third scale; a third slide containing a marker cooperating with said third scale and normally located at a mean position on said third scale, and a fourth scale; and finally a fifth scale on the body of the rule cooperating with said fourth scale.

3. A logarithmically graduated multiple slide rule comprising in respective order: a stationary scale on the body of the rule; an adjacent slide containing a marker cooperating with said scale and normally located at a mean position on said scale, and a second scale; a second slide containing a marker cooperating with said second scale, and a third scale; a third slide containing a marker cooperating with said third scale and normally located at a mean position on said third scale, and a fourth scale; and finally a fifth scale on the body of the rule cooperating with said fourth scale.

4. A logarithmically graduated multiple slide rule comprising in respective order: a series of stationary scales on the body of the rule; an adjacent slide containing a series of markers cooperating with said series of scales and normally located at a mean position in the case of one of said scales and at positions variously displaced from the mean in the case of the other scales in the series, and a second scale; a second slide containing a marker cooperating with said second scale, and a third scale; a third slide containing a marker co-operating with said third scale and normally located at a mean position on said third scale, and a fourth scale; and finally a fifth scale on the body of the rule cooperating with said fourth scale through the agency of a fourth slide, intermediate between said fourth and fifth scales, and containing two markers one adjacent to said fourth scale and one adjacent to said fifth scale.

MARTIN H. REYMOND.